Patented June 4, 1940

2,202,846

UNITED STATES PATENT OFFICE 2,202,846

COPOLYMERS OF POLYALLYL ESTERS AND POLYMERIZABLE UNSATURATED COMPOUNDS

Benjamin S. Garvey, Akron, and Claude H. Alexander, Cuyahoga Falls, Ohio, assignors to The B. F. Goodrich Company, New York, N. Y., a corporation of New York No Drawing. Application May 2, 1936, Serial No. 77,608

11 Claims. (Cl. 260—78)

This invention relates to the polymerization of olefinic compounds and in particular to the formation of mixed polymers having improved physical properties.

The commercial utility of resins like polyvinyl acetate or polystyrene is considerably limited by their plasticity at elevated temperatures, especially when they have been plasticized to decrease their brittleness at low temperatures. Considerations arising from a study of the vulcanization of rubber suggested that this thermoplasticity could be overcome by the formation of bridges between the chain molecules of the polymers.

That this was so was demonstrated by reacting succinic acid with polyvinyl acetate so that it replaced some of the acetic acid in the polymer. The succinic acid could combine with two of the chain molecules and form a bridge between them. The resulting product was much less thermoplastic than the original polyvinyl acetate. Exchange reactions of this type offer several technical difficulties. The reaction involves an equilibrium and its completion requires removal of the molecule eliminated; in this case, acetic acid. Removal from the mass becomes progressively more difficult as its plasticity diminishes, and frequently leaves a blown, porous product. Furthermore the reaction is slow and requires a high temperature.

We have now found that similar results can be obtained by polymerizing mixtures of two different polymerizable compounds, such as mixtures of vinyl acetate and diallyl succinate. The mixed polymers are not soluble in the usual solvents. They are thermoelastic rather than thermoplastic. That is to say, the product which is hard at room temperatures does not become plastic and flow at a higher temperature but becomes flexible and elastic like vulcanized rubber. In a similar manner the usual plasticizers tend to make these mixed polymers elastic rather than plastic.

The essential character of all of these mixtures is that one component is a compound which contains the polymerizable group

and contains no other polymerizable group, and that a second component is a compound which contains the polymerizable group

and, in addition, at least one other polymerizable olefinic double bond separated therefrom by at least one intervening atom. Typical compounds of the first class are: vinyl esters of saturated monobasic acids such as the halogen acids, acetic acid, chloracetic acid, propionic acid, or benzoic acid; acrylic acid or substituted acrylic acids and their esters with monohydric alcohols; monovinyl (or monoisopropenyl) aromatic compounds such as styrene, vinyl naphthalene, isopropenyl benzene, or vinyl phenol; methyl vinyl or methyl isopropenyl ketones; and vinyl alkyl ethers. Typical compounds of the second class are: vinyl or allyl esters of polybasic acids such as succinic, adipic, phthalic, citric, or phosphoric acids; acrylic and substituted acrylic acid esters of polyhydric alcohols such as glycol, glycerine, diethylene glycol, trimethylene glycol; polyethylene itaconate; the reaction product of allyl tartrate with adipyl and succinyl chlorides; vinyl or allyl esters of acrylic or crotonic acids; divinyl ether or the polyvinyl ethers of polyhydric alcohols or phenols such as glycol, diethylene glycol, or hydroquinone; divinyl aromatic compounds such as divinyl benzene; and 2-4 dichlor pentadiene 1-4. These compounds all polymerize readily and completely to form products which are essentially chemically saturated and stable, and which have desirable chemical properties.

It is important for the purpose of this invention that the double bonds in the compounds of the second class be unconjugated, that is, that the two (or more) double bonds be separated by at least one intervening atom. Conjugated dienes such as butadiene tend to polymerize in such a manner that only one double bond disappears, to produce linear polymers which are still chemically unsaturated and more or less soluble and plastic. Mixed polymers of such conjugated dienes with compounds of the first class referred to above similarly remain plastic even when the diene forms as much as 40 or 50% of the product. On the other hand, in the unconjugated compounds of our second class the double bonds can polymerize independently and are therefore capable of entering separate polymer chains so that the compound forms a bridge or link joining the chains. Only a small proportion of such a compound is required to form a sufficient number of bridges to restrain relative movement of the polymer chains.

Any of the compounds in the first class can be polymerized with any of the compounds in the second class by known methods of polymerization such as heating or exposing to actinic light, with or without catalysts, to give products which have lower thermoplasticity and better resistance to solvents than polymers made from compounds of the first class alone.

The properties of the mixed polymers vary widely depending on the proportions of the polymerizable compounds. If vinyl acetate is polymerized with as little as 0.1% of diallyl succinate, the polymer is almost insoluble but is somewhat thermoplastic. It can be milled on a rubber mill and molded in a press. With larger proportions of allyl succinate the polymer is no longer soluble or thermoplastic. When heated it becomes flexible and elastic. On a hot rubber mill it is ground to a fluffy powder.

This improvement in the properties of normally soluble and thermoplastic polymers very materially extends their usefulness. Those polymers containing about 0.1% or less of diallyl succinate can be used as molding plastics. They will still have good physical properties at temperatures at which pure polyvinyl acetate is liquid. They can be molded at high pressures and removed from the hot mold, eliminating the need for cooling the molds and thus speeding up production. The lowered sensitivity to temperature changes permits the use of more plasticizer and hence a wider range of mechanical properties in the finished product. The resistance to solvents permits their use in many places where the pure polyvinyl acetate would be useless.

The products containing more than 1% of diallyl succinate can be sawed, cut, turned and polished. If polymerized in the form of sheets, tubes, rods, or special shapes they can be worked by the methods usually applied to cast plastics.

To illustrate the variation in properties of these mixed polymers the following compounds were compared:

|  | A | B | C | D | E |
|---|---|---|---|---|---|
| Vinyl acetate | 99.0 | 98.96 | 98.9 | 98.0 | 96.0 |
| Diallyl adipate |  | 0.04 | 0.1 | 1.0 | 3.0 |
| Benzoyl peroxide | 1.0 | 1.00 | 1.0 | 1.0 | 1.0 |
|  | 100.0 | 100.00 | 100.0 | 100.0 | 100.0 |

The mixtures were put into iron flasks, filled full and stoppered. They were polymerized by heating for 90 hours at 35° C. The soft flexible polymers were removed and heated in air at 100–120° C. for 15–30 minutes. There was a small loss in weight (½ to 1%) and the polymers were then hard at room temperature. The comparison of solubility and thermoplasticity is shown in the following table.

| Sample | Condition at 25° C. | Condition at 120° C. | Solubility in acetone |
|---|---|---|---|
| A | Hard | Very soft and plastic. Almost syrupy. | Easily soluble. |
| B | do | Soft and moderately plastic. | Slowly soluble. |
| C | do | Soft and somewhat plastic. | Partly soluble, loses shape. |
| D | do | Soft and elastic | Retains shape, swells considerably. |
| E | do | Soft and elastic | Retains shape, swells much less than D. |

Similar results are obtained by substituting diallyl succinate for the diallyl adipate.

A similar improvement in the properties of other polymers can be obtained in the same way. Thus, we can use any of the following mixtures: styrene and divinyl benzene; vinyl ethyl ether and divinyl ether; vinyl chloride and 2-4 dichlorpentadiene 1-4; styrene and diallyl succinate; vinyl acetate and triallyl citrate; vinyl chloride and diallyl succinate; styrene and divinyl ether; vinyl acetate and allyl crotonate.

Coloring materials, plasticizers and pigments may be added to the polymers in those cases in which the polymers are still somewhat plastic and soluble or in case the coloring materials, plasticizers, etc. are capable of diffusing into the polymers. Such materials in so far as they do not inhibit polymerization may also be incorporated in the mixture before polymerization. For example, a product which is non-thermoplastic but still somewhat resilient may be obtained by polymerizing a mixture of 90 parts of vinyl acetate, 1 part of diallyl succinate, and 9 parts of tricresyl phosphate containing 1% of benzoyl peroxide.

It is obvious from the description and examples that many modifications can be made without departing from the spirit of the invention. Various compounds containing one polymerizable group, or mixtures of them, can be polymerized with different compounds containing two or more polymerizable groups, or mixtures of them, with or without the addition of other ingredients to give a wide variety of chemical and physical properties to the polymers. Variations in properties can be controlled at will.

We claim:

1. A process which comprises polymerizing a mixture including vinyl acetate and a polyallyl ester of a saturated polybasic acid.

2. A process which comprises polymerizing a mixture including diallyl succinate and a compound containing the polymerizable group

and no other polymerizable group.

3. A process which comprises polymerizing a mixture including diallyl succinate and a vinyl ester of a saturated monobasic acid.

4. A process which comprises polymerizing a mixture including vinyl acetate and diallyl succinate.

5. A product which includes a mixed polymer of diallyl succinate and at least one compound containing the polymerizable group

and no other polymerizable group.

6. A product which includes a mixed polymer of diallyl succinate and at least one vinyl ester of a saturated mono-basic acid.

7. A product which includes a mixed polymer of vinyl acetate and diallyl succinate.

8. A process which comprises polymerizing a mixture including a polyallyl ester of a saturated polybasic acid, and a compound containing the polymerizable group

and no other polymerizable group.

9. A process which comprises polymerizing a mixture including a polyallyl ester of a saturated polycarboxylic acid, and an ester containing the polymerizable group

and no other polymerizable group.

10. A product which includes a mixed polymer of a polyallyl ester of a saturated polybasic acid, and a compound containing the polymerizable group
and no other polymerizable group.
11. A product which includes a mixed polymer of a polyallyl ester of a saturated polycarboxylic acid, and an ester containing the polymerizable group
and no other polymerizable group.
BENJAMIN S. GARVEY.
CLAUDE H. ALEXANDER.